United States Patent
Banks et al.

(10) Patent No.: US 8,949,348 B2
(45) Date of Patent: Feb. 3, 2015

(54) CONTROLLING MESSAGE DELIVERY IN PUBLISH/SUBSCRIBE MESSAGING

(75) Inventors: Andrew D. J. Banks, Hampshire (GB); Anthony P. Beardsmore, Hants (GB); Ian C. Vanstone, Wellington (NZ)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 13/015,434

(22) Filed: Jan. 27, 2011

(65) Prior Publication Data

US 2011/0258268 A1    Oct. 20, 2011

(30) Foreign Application Priority Data

Apr. 19, 2010  (EP) .................................... 10160365

(51) Int. Cl.
  *G06F 15/16*   (2006.01)
  *G06Q 10/06*   (2012.01)
(52) U.S. Cl.
  CPC ..................................... *G06Q 10/06* (2013.01)
  USPC ...................................................... 709/206
(58) Field of Classification Search
  USPC ....................................................... 709/206
  See application file for complete search history.

(56) References Cited

U.S. PATENT DOCUMENTS

| 2003/0135556 A1* | 7/2003 | Holdsworth ................. 709/206 |
| 2005/0246186 A1* | 11/2005 | Nikolov ............................. 705/1 |
| 2006/0136256 A1 | 6/2006 | Roots et al. |
| 2008/0133337 A1 | 6/2008 | Fletcher et al. |
| 2008/0168122 A1 | 7/2008 | Fletcher et al. |

FOREIGN PATENT DOCUMENTS

WO    2007/063134 A2    6/2007

OTHER PUBLICATIONS

Saida Davies, et al., WebSphere MQ V7.0 Features and Enhancements, Book/Manual, Jan. 2009, pp. I-XXX, 1-398, First Edition, IBM International Technical Support Organization, http://www.redbooks.ibm.com/redbooks/pdfs/sg247583.pdf, Published on the World Wide Web.

Alexandru Berlea, Patent Cooperation Treaty International Search Report and Written Opinion for PCT/EP2010/068455, Feb. 25, 2011, pp. 1-12, Published by the European Patent Office International Searching Authority, Netherlands.

* cited by examiner

*Primary Examiner* — Esther Benoit
(74) *Attorney, Agent, or Firm* — Lee Law, PLLC; Christopher B. Lee (57) ABSTRACT

In response to publication of a topic message on a topic to a messaging system by a publisher application, a determination is made as to whether any subscriber applications are registered for the topic. In response to determining that at least one subscriber application is registered for the topic, the published topic message is delivered to each registered subscriber application. In response to determining that no subscriber applications are registered for the topic, the published topic message is stored and in response to receipt of a first subsequent subscription request from a new subscriber application for the topic, the stored published topic message is delivered to the new subscriber application.

14 Claims, 4 Drawing Sheets

CONTROLLING MESSAGE DELIVERY IN PUBLISH/SUBSCRIBE MESSAGING

RELATED APPLICATIONS

This application claims priority to and claims the benefit of European Patent Application Serial No. EP10160365.2 titled "CONTROLLING MESSAGE DELIVERY IN PUBLISH/SUBSCRIBE MESSAGING," which was filed in the European Patent Office on Apr. 19, 2010, and which is incorporated herein by reference in its entirety.

BACKGROUND

The invention relates to a method of controlling message delivery between one or more publisher applications and one or more subscriber applications in a messaging system and to a messaging system adapted to control such delivery.

Publish/subscribe is a messaging mechanism by which subscriber applications may receive information, in the form of messages, from publisher applications (hereinafter referred to as "publishers" and "subscribers"). In this context, a message is a unit of data for exchange between application programs. A typical publish/subscribe system has more than one publisher and more than one subscriber.

BRIEF SUMMARY

A method includes determining, in response to publication of a topic message on a topic to a messaging system by a publisher application, whether any subscriber applications are registered for the topic; delivering, in response to determining that at least one subscriber application is registered for the topic, the published topic message to each registered subscriber application; and in response to determining that no subscriber applications are registered for the topic: storing the published topic message; and delivering, in response to receipt of a first subsequent subscription request from a new subscriber application for the topic, the stored published topic message to the new subscriber application.

A computer program product includes a computer readable storage medium including computer readable program code, where the computer readable program code when executed on a computer causes the computer to: determine, in response to publication of a topic message on a topic to a messaging system by a publisher application, whether any subscriber applications are registered for the topic; deliver, in response to determining that at least one subscriber application is registered for the topic, the published topic message to each registered subscriber application; and in response to determining that no subscriber applications are registered for the topic: store the published topic message; and deliver, in response to receipt of a first subsequent subscription request from a new subscriber application for the topic, the stored published topic message to the new subscriber application.

A messaging system includes a buffer store; and a processor programmed to: determine, in response to publication of a topic message on a topic to a messaging system by a publisher application, whether any subscriber applications are registered for the topic; deliver, in response to determining that at least one subscriber application is registered for the topic, the published topic message to each registered subscriber application; and in response to determining that no subscriber applications are registered for the topic: store the published topic message in the buffer store; and deliver, in response to receipt of a first subsequent subscription request from a new subscriber application for the topic, the stored published topic message to the new subscriber application.

DETAILED DESCRIPTION

Interactions between publishers and subscribers are controlled by components of a general purpose messaging system, such as a queue manager or by a component known as a message broker. A messaging system is a service to which applications may connect and a queue is a first-in, first-out, ordered list of messages maintained by the messaging system. Applications may place a message on a queue or request a message from a queue. The distinction between a queue manager and a message broker is not relevant to the present subject matter and these terms may be used interchangeably within the following description.

Publishers supply information about a subject, without needing to know anything about the applications that are interested in that information. Publishers generate this information in the form of messages, called publications, that they want to publish, and define the topic of these messages. The controlling component (queue manager or message broker) receives messages from publishers and subscriptions identifying subscribers on one or more topics. It then routes the published messages to the subscribers that have a registered interest in these topics.

Subscribers create subscriptions that describe the topic that the subscriber is interested in. Thus, the subscription determines which publications are forwarded to the subscriber. Subscribers may make multiple subscriptions and may receive information from many different publishers. Subscriptions are registered by an administrator or a subscriber application itself to link a topic to an input or destination queue for a named subscriber application. When an application publishes a message for that topic, a copy of the data will be placed on each input queue with a subscription for that topic. Thus, one topic may have many subscriptions such that a publication is delivered to many queues.

It is the existence of topics that allows the providers and consumers of information to be decoupled in publish/subscribe messaging by removing the need to include a specific destination in each message as is required in point-to-point messaging.

One product which includes such a Publish/Subscribe function as part of its queue manager is IBM® WebSphere® MQ, Version 7, which is a messaging and queuing middleware product. In this and similar products, when a publisher creates an information containing message that it wishes to publish, it publishes it with a topic string that fits the subject of the publication. To receive publications, a subscriber creates a subscription with a pattern matching topic string to select publication topics. The queue manager or message broker then delivers publications to subscribers that have subscriptions that match the publication topic, and are authorized to receive the publications. Subscriptions may also be created administratively, such that the application processing the queue does not need to know that it is operating as a "subscriber."

In subject-based publish/subscribe, publishers, or administrators, are responsible for classifying subjects into topics. A topic is implemented as a text string describing an area of interest on which applications may wish to exchange messages (e.g., "stockprices"). Subjects may be organized hierarchically, such as into a topic tree, using the forward slash ("/") character to create subtopics in the topic string (e.g., "stockprices/acme"). It should also be noted that topics may be implied. Thus, if "stockprices/acme" exists as a topic, then the topic "stockprices" may be implied. Topics are nodes in the topic tree that is the total space of all topics used within the messaging infrastructure. Topics may be leaf-nodes with no further subtopics, or intermediate nodes with subtopics. The topic strings that subscribers create may also contain either of two alternative wildcard schemes to pattern match against the topic strings in publications.

Topic trees are maintained and generated by a topic manager, which is part of the queue manager or message broker, in response to incoming publications or subscription requests. The nodes of the topic tree are subscription topic/subscriber destination pairs (or lists when there are multiple subscribers for a single topic) that the topic manager uses to match incoming publications by topic with the appropriate subscriber destinations.

One or more topic nodes in the tree may have associated administrative information, controlling aspects such as quality of service and security settings. In WebSphere® MQ, this is achieved through the definition of "Topic Objects" that exist outside of the topic tree but reference a given level in the hierarchy. Topics may inherit their attributes from the first parent administrative node found in their topic tree.

Subscriptions may be of two types: durable and non-durable. Non-durable subscriptions exist only as long as the subscribing application's connection to the queue manager remains open. The subscription is removed when the subscribing application disconnects from the queue manager either deliberately or by loss of connection. When the connection is closed, the information about the subscription is removed from the queue manager, and will no longer be visible. No more messages will be put to the subscriber queue.

Durable subscriptions continue to exist when a subscribing application's connection to the queue manager is closed. If a subscription is durable, when the subscribing application disconnects, the subscription remains in place and may be used by the subscribing application when it reconnects. This ensures that all messages on topics to which the subscriber has ever subscribed will eventually be delivered.

Publications may also be of two types. By default, after a publication is sent to all interested subscribers it is discarded. However, a publisher may specify that a copy of a publication should be retained so that it may be sent to future subscribers who register an interest in the topic.

Deleting publications after they have been sent to all interested subscribers may be suitable for event information, but is not always suitable for state information. By retaining a message, new subscribers do not have to wait for information to be published again before they receive initial state information. For example, a subscriber with a subscription to a stock price may receive the current price without waiting for the stock price to change (and hence be re-published).

The queue manager may retain only one publication for each topic, so a topic's existing retained publication may be deleted when a new retained publication arrives at the queue manager.

A Publish/Subscribe system employing both retained publications and durable subscriptions is used as the basis of the WebSphere® MQ Telemetry Transport protocol developed by IBM® Corporation and described broadly in International patent application, publication number WO 2007/063134 entitled "Methods and Apparatus for Remote Monitoring," which is incorporated by reference as if fully set forth herein. This explains how, in the case of remote and distributed plant or equipment, important monitoring information may be preserved for local operation control apparatus even during periods of disconnection by setting an "assured" flag to make the control apparatus's subscription durable. Retained publications may also be useful in providing the last known state of monitoring equipment or data values prior to a failure when a diagnostic application connects and subscribes for the first time after the failure.

These two known techniques of durable subscriptions and retained publications meet the functional requirements of certain applications, such as the telemetry transport described above. However, they do not guarantee that a publication will be seen by a subscriber at a later time or date if no subscriber is currently registered. The last publication from a publisher may be flagged as retained but earlier publications will be lost. The present subject matter addresses a need in the industry for such a guaranteed delivery system.

Using the present subject matter, if subscribers exist and it is possible to deliver the message on a publisher specified topic to them at publication time, then that delivery is performed. However, if no subscriber is present for the given topic, the message (and all subsequent messages on the topic) is stored and later delivered if and when a subscriber registers for this topic.

This may be referred to herein as providing an "at-least-once" quality of service in a publish/subscribe context.

The messaging system described herein includes a messaging and queuing system and successive messages for a specified topic are stored on a queue for the specified topic and also published messages on other specific topics for which no subscriber is registered are stored on respective queues.

In such a messaging system, in response to subsequent registration of a new subscriber application for a specified topic, delivery includes moving stored messages on the specified topic queue to an input queue at the subscriber application.

As a default, a stored specified topic message or messages may be discarded after delivery to a new subscriber application.

It is also possible that the stored specified topic message or messages may be delivered to any other new subscriber applications that register for the specified topic within a predetermined time of the first such new registration before being discarded. For example, the predetermined time may be zero so that the message or messages may be delivered only to subscriber applications that registered simultaneously for the specified topic.

In order to avoid locking up of applications and to trigger generation of an appropriate feedback message, the present subject matter may be implemented such that if no new subscriber application registers for the published topic within a predetermined time, the topic message or messages may be discarded.

One example of a scenario in which the present subject matter may be applied is a notification system, where a group of users (Alice, Bob, Charles) may receive messages via a number of electronic devices they use (each user may have, for example, a desktop at work, a smart phone, and a laptop they sometimes use at customer sites). As they may log on to the notification system in multiple places, they would like each device to receive any new notification messages, so that whichever screen they happen to be looking at during the time will let them know they have a message. To achieve this result, the notification application on each device may subscribe on the topic "AlicesMessages", "BobsMessages", or "CharlesMessages" respectively, and publications may be sent out to all devices that are attached. However, if all of their devices are currently switched or logged off (that is, they are not registered as subscribers), the users may still like to see any messages for them the next time they turn one of the devices on. This may be achieved, by a messaging system according to the present subject matter. This gives the benefits of publish/subscribe: push, rather than pull of messages and one-to-many delivery. No administrative decision to subscribe in advance is necessary. Messages are stored for the topic, and as and when someone registers an interest the messages are available.

Figure 1:
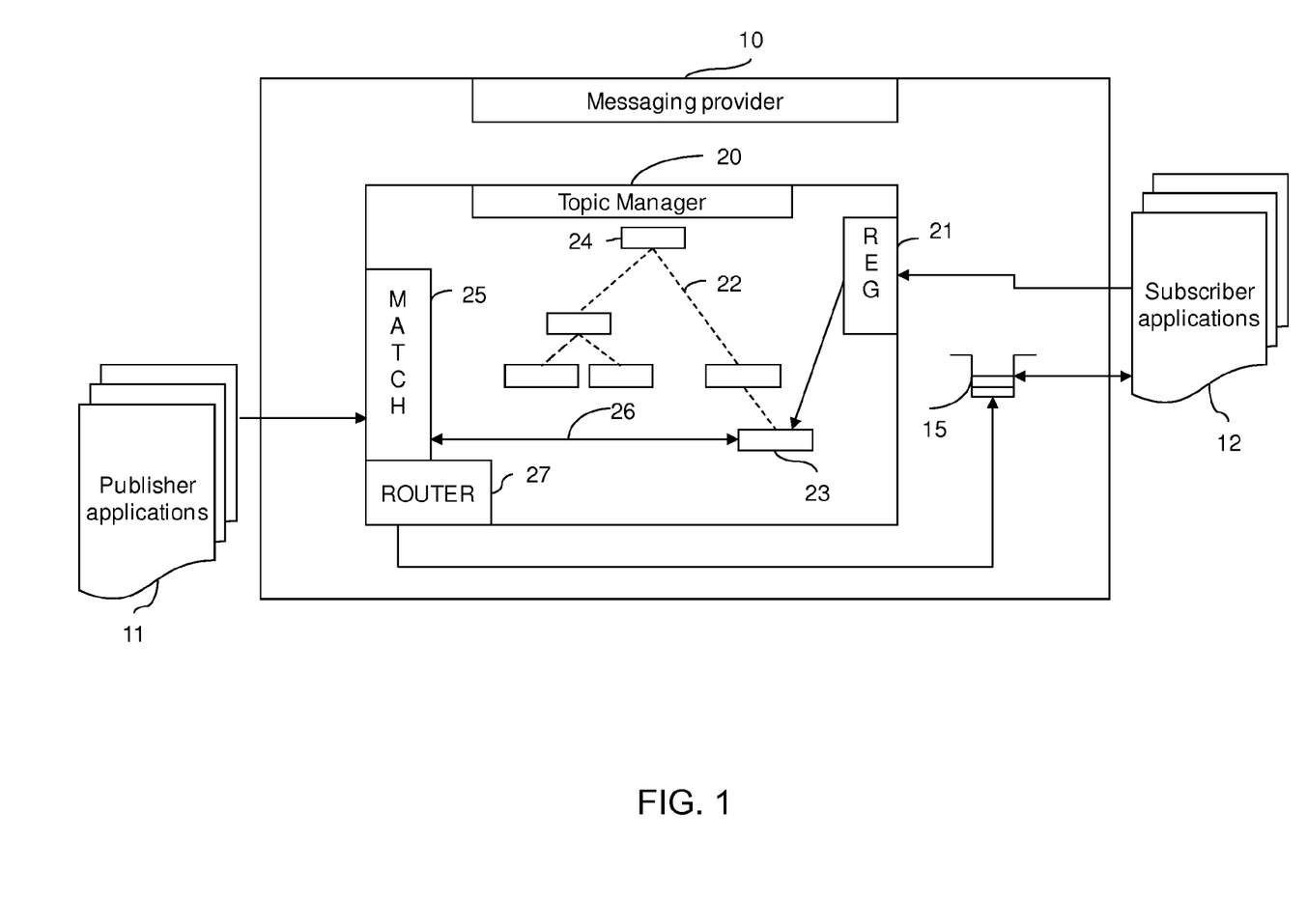
FIG. 1 is a block diagram of an example of an implementation of a messaging system according to an embodiment of the present subject matter.

FIG. 1 is a block diagram of an example of an implementation of a messaging system. In FIG. 1, there is shown in schematic and simplified form, the relevant portions of the messaging system in which a messaging provider 10, such as IBM® WebSphere® MQ V 7.0, controls the delivery of messages between one or more publisher applications 11 and one or more subscriber applications 12.

In the publish/subscribe messaging system, the connection of each subscriber application 12 to the messaging provider 10 causes the creation of a queue, such as queue 15, on which messages for the specific subscriber may be placed. At the same or any time afterwards, the subscriber application may register a subscription for a topic in which it is interested with registration component 21 of a topic manager 20, which is part of the messaging provider 10. Subscribers may do this on a durable basis (once registered, the subscription remains until explicitly deleted) or a non-durable basis (when the application disconnects, the subscription is removed).

A tree 22 of known topics is maintained within the messaging system in which nodes, such as node 23, each record both a topic string and a list of subscriptions for the respective registered topic. A base or administrative node 24 at the top of the tree defines attributes of its child topics, such as for example security and duration. When a publisher application 11 publishes a message to a given topic, defined by a topic string portion of the message, match component 25 in the topic manager compares the published topic with the nodes of the tree 22 and identifies the matching topic node, if there is one, and the associated list of subscribers for that topic. If a matching registration is found, the address of each corresponding subscriber is returned, as indicated for example by double headed line 26, in an iterative fashion if there are multiple subscribers. The message or a copy thereof is then delivered by router component 27 to the appropriate subscriber queue or queues, such as the queue 15. The application may then retrieve ("get") the message from the subscriber queue for further processing, either in response to a trigger event or when it has a need for the information. However, if no matching node and therefore no subscriptions are found by match component 25, the message may be discarded.

As described above, a need may arise for all messages published on certain topics to be retained automatically for delivery to subscribers who register (subscribe) subsequently for those topics. This may be controlled by a new setting on a "topic object" or administrative node, similar to node 24, controlling the particular topic string.

Figure 2:
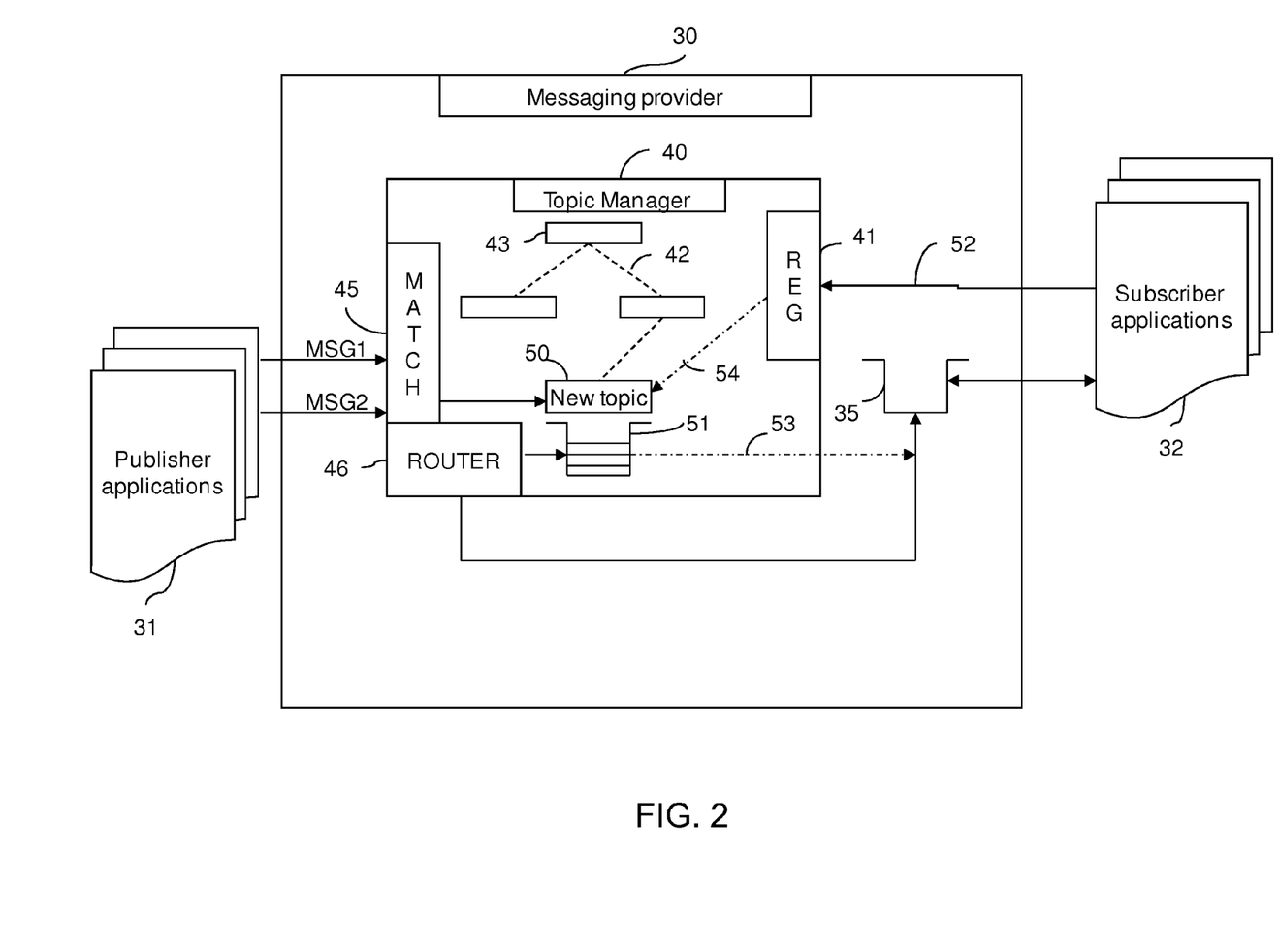
FIG. 2 is a block diagram of an example of an implementation of a messaging system for controlling message delivery in publish/subscribe messaging according to an embodiment of the present subject matter.

FIG. 2 is a block diagram of an example of an implementation of a messaging system for controlling message delivery in publish/subscribe messaging. The messaging system of FIG. 2 includes publisher applications 31 and subscriber applications 32 being connected for delivery of published messages through a messaging provider 30. It is understood that one or more processors operate within the messaging system to perform the functionality described. When one of the subscriber applications 32 initially connects to the system, a subscriber input queue 35 is created for accepting messages delivered to the subscriber. A topic manager 40 creates a topic tree 42 in response to publications from publisher applications 31 and subscriptions from subscriber applications 32. The topic manager 40 also defines an associated subscriber list space associated with each node. New subscriptions are registered by registration component 41 by adding the subscriber identification and address to the subscriber list associated with the node. Subscribers may then be matched with incoming publications by match component 45.

If a publication is received for an existing topic, then the match component 45 finds a match and the published message is delivered directly to the registered subscriber's input queue 35 by router component 46.

However, if a publication, such as MSG1, arrives before there are any subscriptions for its topic, then a topic object associated with an administrative node 43 ensures that, as well as a new topic tree node, such as node 50, being created, a dedicated queue 51 (e.g., buffer store) is created to act as a buffer and is assigned to the particular topic node. Since no subscriptions for the given topic exist, the message is stored on the dedicated queue 51 for future delivery. Further messages for the same topic may be added to the queue 51 as they arrive, as long as there is still no registered subscriber.

In response to a subscriber eventually subscribing to the new topic on node 50, as indicated by line 52, a check is performed to see if messages are waiting on the associated dedicated queue 51. If messages are present, the system will loop through all messages on the queue 51, moving them directly to the queue 35 of the new subscriber, as indicated by dot-dashed line 53, discarding them from queue 51 in the process.

An alternative is to register the subscription and then re-drive publication processing—act as if each message on the holding queue (e.g., the dedicated queue 51) has just arrived again, and take a fresh look at the list of subscribers held on the node. This adds the benefit described above of allowing for multiple subscribers coming in.

When all messages on the queue 51 have been processed, the subscription is registered by registration component 41, as indicated by dot-dashed line 54, and added to the subscription list for the new node. Any subsequent publications may then be dealt with in response to arrival. This is illustrated by assuming a new message, MSG2, is now published by the respective publisher application 31 on the new topic 50. Matching with the now registered subscriber application 32 may occur and the router component 46 may deliver MSG2 directly to respective subscriber queue 35.

Figure 3:
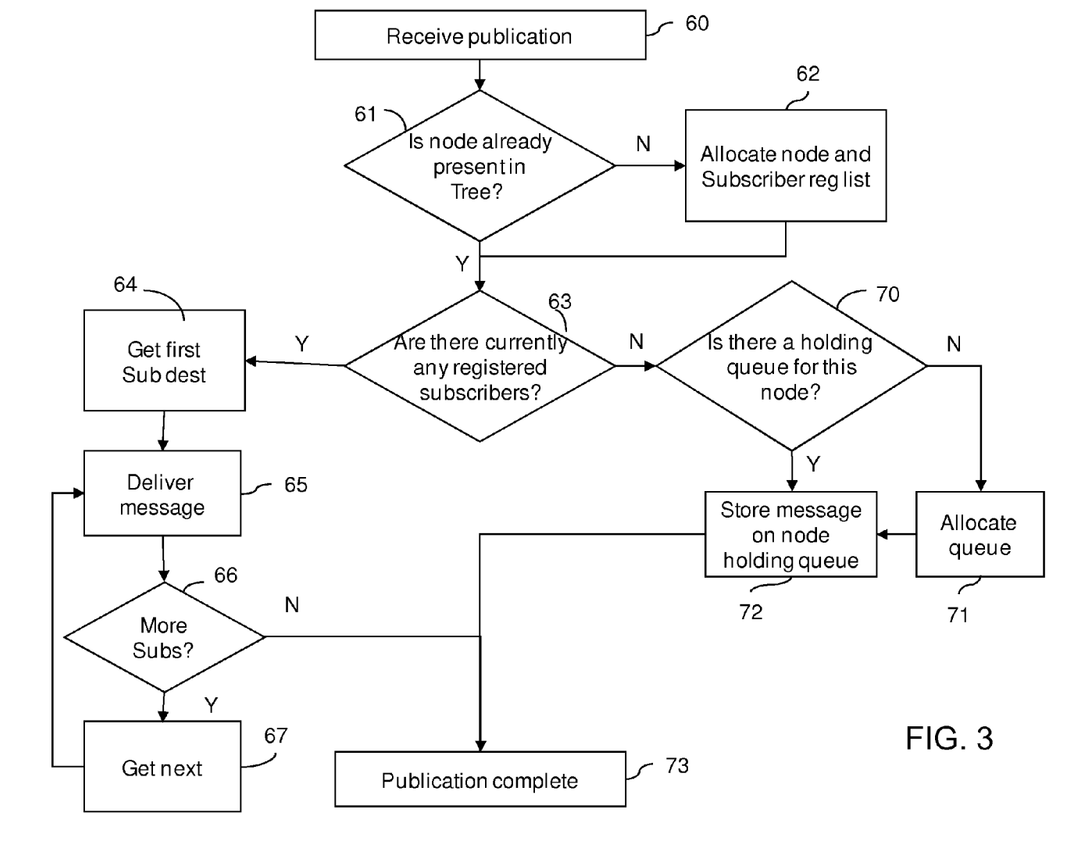
FIG. 3 is a flow chart of an example of an implementation of processing of the messaging system of FIG. 2 for controlling message delivery in publish/subscribe messaging on receipt of a publication according to an embodiment of the present subject matter.

FIG. 3 is a flow chart of an example of an implementation of processing of the messaging system of FIG. 2 for controlling message delivery in publish/subscribe messaging on receipt of a publication. FIG. 3 shows the detailed steps of the method carried out by a publisher application, such as the publisher application 31 in FIG. 2, according to one example of the present subject matter. Following receipt of a publication in step 60, the topic manager 40 determines in step 61 whether a corresponding topic node is already present in the topic tree 42. If not, a new node (e.g., 50 in FIG. 2) including a corresponding subscriber registration list is allocated in step 62. The subscriber registration list will initially be empty.

If however, there is an existing node within the topic tree for the topic of the publication, in step 63 it is determined whether there are any currently registered subscribers. If there are, the subscriber destination queue for the first registered subscriber (created when the subscriber application is first connected to the messaging system) is retrieved in step 64 from the subscription list and the publication message is delivered to the subscriber queue (step 65). If there is more than one registered subscriber (step 66), the next subscriber destination queue is retrieved, in step 67, and the process continues iteratively until the message has been delivered to all the registered subscribers.

If, however, in step 63, it is determined that there are no registered subscribers for the topic of the newly received publication, it is determined in step 70 whether a holding queue (e.g., the dedicated queue 51 in FIG. 2) has been set up for the topic. If not, such a holding queue is allocated in step 71. In response to allocating the holding queue or if the holding queue is already in existence, the new publication message is stored in the holding queue in step 72. Publication of each message is then complete (step 73). Successive messages for the new topic continue to be stored on the holding queue until such time as a subscription is received for the new topic.

Figure 4:
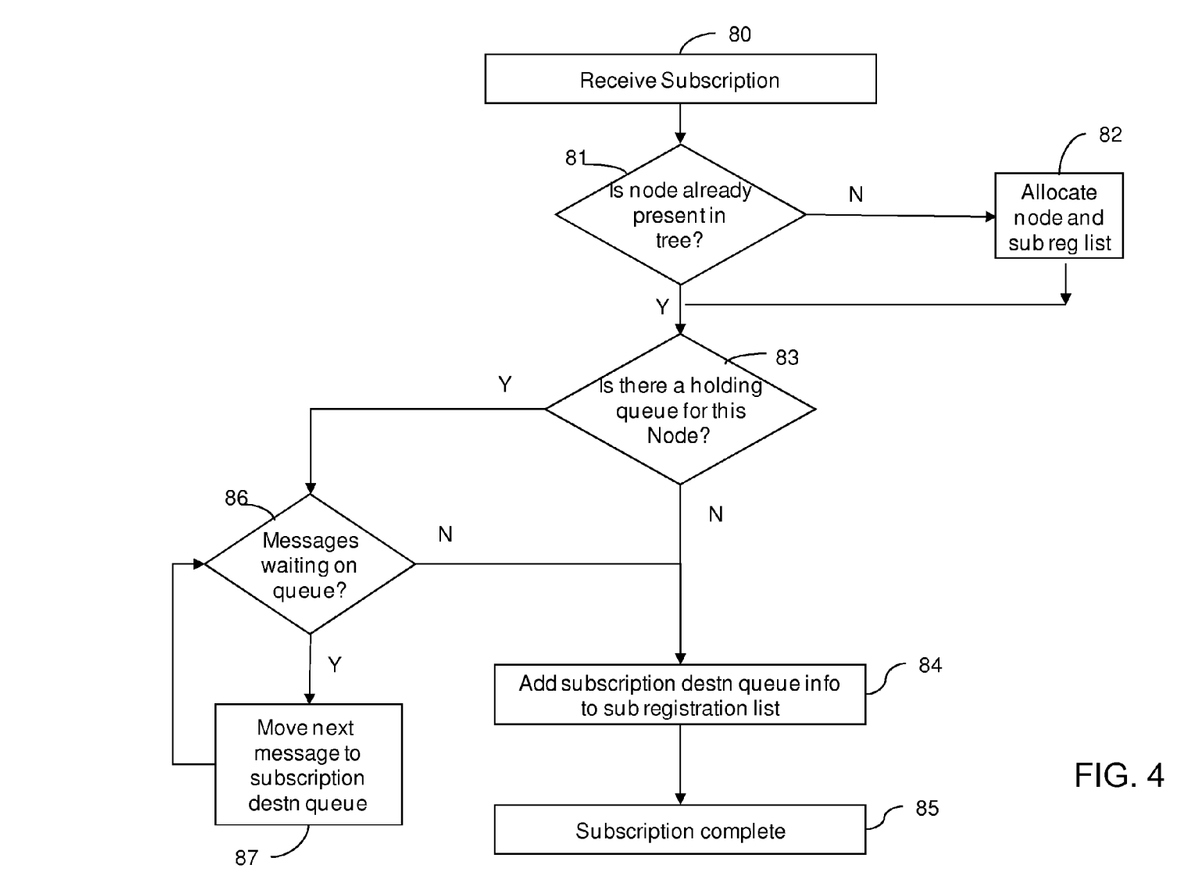
FIG. 4 is a flow chart of an example of an implementation of processing of the messaging system of FIG. 2 for controlling message delivery in publish/subscribe messaging on receipt of a subscription according to an embodiment of the present subject matter.

FIG. 4 is a flow chart of an example of an implementation of processing of the messaging system of FIG. 2 for controlling message delivery in publish/subscribe messaging on receipt of a subscription. FIG. 4 shows in detail the method steps carried out by a subscriber application, such as a subscriber application 32 in FIG. 2, according to one example of the present subject matter. Assume that a new subscription is received in step 80, a subscription destination queue will be allocated by the messaging system/queue manager when the corresponding subscriber application first connects. The first check, in step 81, is whether there is already a node for the topic of the subscription in the topic tree (e.g., the topic tree 42 in FIG. 2). If not, a node and associated subscription registration list are allocated (step 82).

If there is a node already present in the tree, as determined in step 81, messages on the topic may already have been published. It is thus determined, in step 83, whether there is a holding queue for the node on which such messages may have been buffered. If there is no holding queue, then no messages are pending and the subscription destination queue information, such as queue 35 in FIG. 2, may be added to the subscription registration list immediately (step 84). This completes the subscription (step 85).

If it is determined that there is a holding queue for the node in step 83, then it is determined whether there are published messages on the holding queue in step 86. If so, these are moved, in step 87, to the respective subscription destination queue 35. When all such messages have been moved from the holding queue to the subscription destination queue, the subscription destination queue information is added to the subscription registration list by step 84 and the subscription process is completed (step 85) by this alternative route.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method, comprising:
   determining, in response to publication of a topic message on a topic to a messaging system by a publisher application, whether any subscriber applications are registered for the topic;
   delivering, in response to determining that at least one subscriber application is registered for the topic, the published topic message to each registered subscriber application; and
   in response to determining that no subscriber applications are registered for the topic:
   storing the published topic message;
   delivering, in response to receipt of a first subsequent subscription request from a new subscriber application for the topic, the stored published topic message to the new subscriber application;
   delivering the stored published topic message to any other new subscriber applications that register for the topic within a first predetermined time of the first subsequent subscription request prior to discarding the stored published topic message, where the first predetermined time is configurable to zero to allow configuration of stored message delivery only to subscriber applications that register for the topic simultaneously with the new subscriber application; and
   discarding the stored published topic message if no subscriber application registers for the topic within a second predetermined time of publication of the topic message on the topic.

2. The method of claim 1, further comprising storing successive messages for the topic on a topic queue associated with the topic.

3. The method of claim 2, further comprising:
   in response to receipt of each published topic message on an additional topic for which no subscriber application is registered:
   allocating a topic queue for the additional topic; and storing the published topic message on the topic queue allocated for the additional topic.

4. The method of claim 2, where delivering, in response to receipt of the first subsequent subscription request from the new subscriber application for the topic, the stored published topic message to the new subscriber application comprises moving stored messages on the topic queue associated with the topic to an input queue of the new subscriber application.

5. The method of claim 1, further comprising discarding the stored published topic message in response to delivery of the stored published topic message to the new subscriber application.

6. A computer program product comprising a computer readable storage device including computer readable program code, where the computer readable program code when executed on a computer causes the computer to:
    determine, in response to publication of a topic message on a topic to a messaging system by a publisher application, whether any subscriber applications are registered for the topic;
    deliver, in response to determining that at least one subscriber application is registered for the topic, the published topic message to each registered subscriber application; and
    in response to determining that no subscriber applications are registered for the topic:
    store the published topic message;
    deliver, in response to receipt of a first subsequent subscription request from a new subscriber application for the topic, the stored published topic message to the new subscriber application;
    deliver the stored published topic message to any other new subscriber applications that register for the topic within a first predetermined time of the first subsequent subscription request prior to discarding the stored published topic message, where the first predetermined time is configurable to zero to allow configuration of stored message delivery only to subscriber applications that register for the topic simultaneously with the new subscriber application; and
    discard the stored published topic message if no subscriber application registers for the topic within a second predetermined time of publication of the topic message on the topic.

7. The computer program product of claim 6, where the computer readable program code when executed on the computer further causes the computer to:
    store successive messages for the topic on a topic queue associated with the topic; and
    in response to receipt of each published topic message on an additional topic for which no subscriber application is registered:
    allocate a topic queue for the additional topic; and
    store the published topic message on the topic queue allocated for the additional topic.

8. The computer program product of claim 7, where, in causing the computer to deliver, in response to receipt of the first subsequent subscription request from the new subscriber application for the topic, the stored published topic message to the new subscriber application, the computer readable program code when executed on the computer causes the computer to move stored messages on the topic queue associated with the topic to an input queue of the new subscriber application.

9. The computer program product of claim 6, where the computer readable program code when executed on the computer further causes the computer to discard the stored published topic message in response to delivery of the stored published topic message to the new subscriber application.

10. A messaging system, comprising:
    a buffer store in a memory; and
    a processor programmed to:
    determine, in response to publication of a topic message on a topic to the messaging system by a publisher application, whether any subscriber applications are registered for the topic;
    deliver, in response to determining that at least one subscriber application is registered for the topic, the published topic message to each registered subscriber application; and
    in response to determining that no subscriber applications are registered for the topic:
    store the published topic message in the buffer store;
    deliver, in response to receipt of a first subsequent subscription request from a new subscriber application for the topic, the stored published topic message to the new subscriber application;
    deliver the stored published topic message to any other new subscriber applications that register for the topic within a first predetermined time of the first subsequent subscription request prior to discarding the stored published topic message, where the first predetermined time is configurable to zero to allow configuration of stored message delivery only to subscriber applications that register for the topic simultaneously with the new subscriber application; and
    discard the stored published topic message if no subscriber application registers for the topic within a second predetermined time of publication of the topic message on the topic.

11. The messaging system of claim 10, where the processor is further programmed to store successive messages for the topic on a topic queue associated with the topic in the buffer store.

12. The messaging system of claim 11, where the processor is further programmed to:
    in response to receipt of each published topic message on an additional topic for which no subscriber application is registered:
    allocate a topic queue for the additional topic in the buffer store; and
    store the published topic message on the topic queue allocated for the additional topic.

13. The messaging system of claim 11, where, in being programmed to deliver, in response to receipt of the first subsequent subscription request from the new subscriber application for the topic, the stored published topic message to the new subscriber application, the processor is programmed to move stored messages on the topic queue associated with the topic to an input queue of the new subscriber application.

14. The messaging system of claim 10, where the processor is further programmed to discard the stored published topic message in response to delivery of the stored published topic message to the new subscriber application.

* * * * *